3,114,736
SHRINKAGE FOILS PRODUCED FROM ETHYL-ENE-VINYLESTER-COPOLYMERS
Herbert Bartl, Cologne-Stammheim, and Hans Scheurlen, Leverkusen, Germany, assignors to Farbenfabriken Bayer Aktiengesellschaft, Leverkusen, Germany, a corporation of Germany
No Drawing. Filed Oct. 2, 1959, Ser. No. 843,910
Claims priority, application Germany Oct. 7, 1958
3 Claims. (Cl. 260—87.3)

The present invention relates to shrinkage foils and more especially to shrinkage foils produced from film-forming copolymers of ethylene and an organic vinyl ester said copolymers being at least partially hydrolyzed.

There are employed, for various packing purposes, so-called shrinkage foils which are stretched in manufacture and have the property of contracting under the action of heat, so that the articles which are packed are tightly enclosed without any air bubbles by the said foils. For this purpose, there are for example employed foils consisting of vinylidene chloride polymers containing plasticizer. However, the content of plasticizers in these foils is very disadvantageous in many cases, since the plasticizers can diffuse out of the foils. The polyethylene terephthalate foil likewise used for packing purposes, in spite of relatively good shrinkage, has the disadvantage that it cannot be heat-sealed. This heat-sealing is essential in most cases for a permanent or durable wrapping. Many other foil-forming plastics which are free from plasticizer are however not suitable as shrinkage foils, since the foils, even when they are highly stretched, only shrink slightly as soon as they are subjected to a heat treatment.

It has now been found that foils produced from at least partially hydrolyzed copolymers of ethylene and vinyl acetate and/or vinyl propionate can be very highly stretched and, on being heated, are also able to shrink again, so that they are excellently suitable for the production of physiologically satisfactory shrinkage foils. Furthermore, these foils can be satisfactorily and durably welded by the action of heat by methods which as such are well known in the art.

Non-tacky foils with particularly high strength and an excellent shrinkage effect and which are in addition crystal clear are also obtained from partially or completely saponified copolymers of ethylene and the said vinyl esters, which advantageously contain 20 to 70 percent preferably 30 to 50 percent by weight of vinyl acetate and/or propionate incorporated by polymerization whereby preferably 1 to 90 percent of said ester groups are saponified.

These copolymers can be prepared by known polymerization processes, for example by activation with free radical-forming catalysts such as organic peroxides or azo compounds as for instance α,α-azodiisobutyric acid nitrile or also with so-called co-ordination catalysts such as vanadium chlorides which are reduced with aluminum trialkyls. The average molecular weight of these copolymers should be at least 20,000.

The physical properties of the shrinkage foils from these copolymers are of particularly high quality when the copolymers are manufactured in accordance with French patent specification No. 1,189,387 (corresponding to copending United States patent application Serial No. 703,763), now U.S. Patent No. 2,947,735, in the absence of wetting agents and in the presence of tertiary butyl alcohol. As shown in said French specification the copolymers containing 5 to 35 percent by weight of copolymerized vinylesters are produced by copolymerizing ethylene and at least one vinyl ester selected from the group consisting of vinyl acetate and vinyl propionate, in a homogeneous liquid phase consisting essentially of tertiary butyl alcohol and said vinyl ester, at temperatures between 10 and 200° C. and at a pressure of at least 10 atm. in the presence of an organic free radical-forming polymerization catalyst such as an organic peroxy compound or α,α-azodiisobutyric acid nitrile and in the absence of an emulsifying agent, said tertiary butyl alcohol being present in an amount by weight of 3 to 10 times to that of vinylester, the ethylene and said vinylester being used in a proportion by weight varying between about 1:1 and 10:1, preferably 1:1 and 5:1. Moreover, in carrying through this process there may also be added water to the homogeneous liquid phase in a proportion which can be absorbed by the tertiary butyl alcohol-vinylester mixture with maintenance of a homogeneous phase the water being present in smaller amounts than said tertiary butyl alcohol it being preferred to adjust the pH value of the homogeneous liquid phase to 3 to 7.

The saponification of these copolymers can be effected by known methods, for example by the action of aqueous alkalis or of lower aliphatic alcohols (such as methanol, ethanol, propanol, butanol) in the presence of a trans-esterification catalyst, such as for example hydrogen chloride or alkaline metal alcoholates.

The non-saponified copolymers are soluble in mixtures of the above lower aliphatic alcohols (5 to 50 percent by weight as calculated on the total weight of solvents) with aromatic and/or chlorinated hydrocarbons, as for instance benzene, toluene, methylenechloride, trichloroethylene, carbontetrachloride, ethylenechloride. The solutions resulting from the saponification of the copolymers may be directly used for casting films therefrom. The foils are preferably prepared with a thickness of about 0.02 to 0.5 mm.

The physical properties of the copolymers are dependent on the vinyl ester content. The copolymers with a high vinyl ester content can have a certain degree of tackiness. The tackiness can be satisfactorily eliminated by admixture of suitable fillers, such as for example finely divided silicic acid fillers as they are put on the market under the trade name "Aerosil," these fillers being preferably applied in amounts of 5 to 40 percent by weight on the weight of copolymer.

The foils are stretched by processes known per se, longitudinally but preferably both longitudinally and transversely of the direction of flow for about 50 to 300 percent (that is to say a foil of 100 cm. length is stretched to 150 to 400 cm.). It is not necessary to heat when stretching the extruded foils. The stretched foils prepared from the polymers which have been described are almost completely transparent and have dimensional stability i.e. they show no shrinkage at room temperature. But they shrink readily when they are heated to temperatures of 50 to 100° C., for instance when dipping the stretched foils into hot water. The amount of shrinkage obtained with the stretched foils is about 20 to 100 percent. In view of this shrinkage capacity and in view of the absence of any plasticizers the stretched foils are well suited as shrinkage foils for wrapping foodstuffs such as cheese, poultry, meat.

The shrinkage properties of the foils according to the invention are explained in the following example. Foils with a thickness of 0.3 to 0.4 mm. are produced by means of a worm-type extrusion machine and a wide slotted nozzle. From these foils, strips are stamped out with the dimensions 100 x 12 mm., which are then stretched with an advancing movement of 50 mm./min. to the length indicated in each case. The shrinkage values are measured after brief immersion (5 seconds) of the stretched strips in water of different temperatures.

*Example*

Foil of a copolymer of ethylene and vinyl acetate (35 percent), in which about 40 percent of all acetyl groups are saponified. The copolymer is prepared by the process of French Patent No. 1,189,387.

| Measured length before stretching, mm. | Measured length after stretching, mm. | Percent shrinkage at ° C. | | | | |
|---|---|---|---|---|---|---|
| | | 60 | 70 | 80 | 90 | 100 |
| 50 | 100 | 20 | 28 | 33 | 38 | 40 |
| 50 | 155 | 20 | 30 | 36 | 45 | 59 |
| 50 | 200 | 19 | 26 | 35 | 45 | 60 |

The copolymer is produced as follows:

10,000 cc. of tertiary butanol and 1,800 cc. of vinyl acetate having dissolved therein 7 g. of α,α-azodiisobutyric acid nitrile are introduced into a stainless steel autoclave equipped with a stirrer device and having a capacity of 20 liters, whereafter the atmospheric oxygen is completely removed by flushing with ethylene which is as far as possible free from oxygen. Ethylene is forced into the autoclave until a pressure of 100 atm. is reached, the contents of the autoclave being quickly heated to 63° C. Thereafter, more ethylene is introduced until a pressure of 400 atm. is reached. As soon as the pressure starts to fall, fresh ethylene is supplied, so that an ethylene pressure of about 400 atm. is maintained throughout the entire polymerization period. After 18 hours, the autoclave is cooled, the excess ethylene is released and the autoclave is opened. The polymerization product is dried. Yield of copolymer 3,100 g., containing 35 percent of incorporated vinyl acetate.

The saponification of the aforementioned copolymer is carried through as follows:

The copolymer is dissolved in a mixture of 6 parts by volume of benzene and 4 parts by volume of ethanol to produce a solution containing 25 percent of said copolymer. Into said solution there are introduced 2 percent (as calculated on the weight of copolymer) of hydrogen chloride. Thereafter the solution is kept for 5 hours while stirring at 70° C., the hydrolysed copolymer is precipitated by pouring the solution into methanol, thereafter washed with methanol and dried.

Instead of the aforementioned copolymer containing 35 percent of incorporated vinyl acetate it may be also used a copolymer containing 50 percent of vinyl acetate which is hydrolysed in the same manner as pointed out above. Said copolymer is produced according to the prescription given above for the production of the copolymer having incorporated 35 percent of vinyl acetate with the alteration that 3,000 cc. instead of 1,800 cc. of vinyl acetate are used. The yield is 3,800 g. of copolymer.

What is claimed is:

1. Heat-sealable foils of a copolymer produced by copolymerizing ethylene and at least one vinylester selected from the group consisting of vinyl acetate and vinyl propionate, in a homogeneous liquid phase consisting essentially of tertiary butyl alcohol and said vinylester, at temperatures between 10 and 220° C. and at a pressure of at least 10 atm. in admixture with a polymerization catalyst selected from the group consisting of an organic peroxy compound and alpha,alpha-azodiisobutyric acid dinitrile and in the absence of an emulsifying agent, said tertiary butyl alcohol being present in an amount of weight of 3 to 10 times to that of vinylester, the ethylene and said vinylester being used in a proportion by weight varying between about 1:1 and 10:1, to produce solid copolymers having an organic molecular weight of at least 20,000 in which the vinylester is incorporated in an amount of about 20 to 70 percent by weight, and then saponifying the ester groups of said copolymer to the extent of 1–90%.

2. The heat-sealable foils of claim 1 wherein said copolymerization is carried out in a homogeneous liquid phase having a pH of 3 to 7 and consisting essentially of tertiary butyl alcohol, said vinylester and water in a proportion which can be absorbed by the tertiary butyl alcohol-vinylester mixture with maintenance of a homogeneous phase, the water being present in smaller amounts than said tertiary butyl alcohol, said foils having been stretched to at least 150% of their original length and thereafter subjected to a heat treatment at temperatures of at least 50° C. to cause shrinkage of said stretched foils.

3. Heat-sealable foils of a copolymer of ethylene and a vinylester, said copolymer having been produced by copolymerization of ethylene and a vinylester selected from the group consisting of vinyl acetate and vinyl propionate in a homogeneous liquid phase consisting essentially of tertiary butyl alcohol and said vinylester, at temperatures between 10° and 200° C. and at a pressure of at least 10 atm. in admixture with a polymerization catalyst selected from the group consisting of an organic peroxy compound and alpha,alpha-azodiisobutyric acid dinitrile and in the absence of an emusifying agent, said tertiary butyl alcohol being present in an amount by weight of 3 to 10 times to that of vinylester, the ethylene and said vinylester being used in a proportion by weight varying between 1:1 and 10:1 to produce solid copolymers having an organic molecular weight of at least 20,000 in which the vinylester is present in an amount of not over 35% by weight, whereupon the ester groups of said copolymer are saponified to the extent of 1–90% and the foils formed from the resulting partially hydrolyzed copolymer are stretched to at least 150% of their original length, the resulting stretched foil having the property of contracting when subjected to a heat treatment at temperatures of at least 50° C.

References Cited in the file of this patent
UNITED STATES PATENTS

| | | |
|---|---|---|
| 2,386,347 | Roland | Oct. 9, 1945 |
| 2,399,653 | Roland | May 7, 1946 |
| 2,467,234 | Sargent et al. | Apr. 12, 1949 |
| 2,865,765 | Allen | Dec. 23, 1958 |
| 2,947,735 | Bartl | Aug. 2, 1960 |

FOREIGN PATENTS

| | | |
|---|---|---|
| 1,189,387 | France | Oct. 2, 1959 |